United States Patent [19]

Squibb

[11] 4,256,184
[45] Mar. 17, 1981

[54] REVERSE-DISH TILLER BLADES

[76] Inventor: John W. Squibb, R.R. 1, Box 755, Bois D'Arl, Mo. 65612

[21] Appl. No.: 12,131

[22] Filed: Feb. 14, 1979

[51] Int. Cl.³ .............................................. A01B 15/16
[52] U.S. Cl. .................................... 172/531; 172/604
[58] Field of Search ........................ 172/531, 604, 120

[56] References Cited

U.S. PATENT DOCUMENTS

| | | | |
|---|---|---|---|
| 395,638 | 1/1889 | Stuart | 172/604 X |
| 420,403 | 1/1890 | Boyer | |
| 1,058,140 | 4/1913 | Beene | |
| 2,029,872 | 2/1936 | Johnson | |
| 2,164,214 | 6/1939 | Lindgren | |
| 2,503,993 | 4/1950 | Blomgren | |
| 2,539,053 | 1/1951 | Blackledge | |
| 2,547,444 | 4/1951 | Curry | 172/531 |
| 2,691,933 | 10/1954 | Emerson | |

*Primary Examiner*—Paul E. Shapiro

*Attorney, Agent, or Firm*—Cushman, Darby & Cushman

[57] ABSTRACT

A disk tiller blade which cuts, rather than pushes laterally, soil, in keeping with minimum tillage practices so as to greatly reduce the energy exerted in driving a gang of disks. The blade is generally circular and divided into either semicircular or quarter concavo-convex sections. The concave surface of each section faces in a direction opposite the concave surface of adjacent sections. Interconnecting members interconnect adjacent sections. In the semicircular section embodiment, the mounting means has a longitudinal axis which lies in a plane define in the interconnecting member. In the quarter section embodiment, each section is turned so that the plane defined by the outer edge of each section forms an angle of less than 90° with the longitudinal axis of the mounting means. The shape of the disk is adjusted so that the perpendicular distance between each point along the outer edge of the disk to the longitudinal axis of the mounting means is constant.

12 Claims, 5 Drawing Figures

REVERSE-DISH TILLER BLADES

BACKGROUND OF THE INVENTION

The present invention relates to disk tiller blades, particularly reverse-dish blades for a rotary tiller.

Tillage is the working of the soil in order to change its structure, kill weeds, or the like. It may be desirable to change the structure of the soil in order to facilitate the storage of moisture and generally enable maximum growth. Weeds may rob a crop of water, nutrients and light and are therefore generally undesirable.

A number of implements are known in the art for manipulating the soil. Plows are dragged through the earth, thereby manipulating it. The shape of the plow blade tends to cut a trench, or furrow, throwing to one side the soil that was in the trench. Since the plow is dragged through the soil and since the soil is thrown laterally with respect to the direction of motion of the plow, a great deal of energy is needed to pull it.

Disk tillers are also known in the art employing round concave disks which rotate about a shaft. The rolling of the disks through the soil tends to push the soil in one direction. Since the disks rotate through the soil, instead of being dragged, the energy necessary to pull a disk tiller is less than the energy necessary to pull a plow. However, a great deal of energy is still necessary to move the soil laterally.

Since disk tillers tend to push the soil to one side, it is common to drag two axles of disks, the second axle pushing the dirt in a direction opposite to that of the first axle. The large quantity of energy necessary to move the axles of disks through the soil requires that the tractor burn a great deal of fuel to accomplish the tilling.

Furthermore, it has been determined that excessive tillage tends to break down the structure of the soil so that the average soil particle size becomes very small. Upon the occurrence of a rainfall, the small particle size leads to caking which prevents water penetration. Thus, the concept of minimum tillage has gained acceptance. The idea is to till the soil to the minimum extent necessary to prepare the soil for seeding. Tilling methods that push the soil laterally, such as plowing and conventional disk tilling, tend to overwork the soil, thus causing the soil structure to break down. Furthermore, such conventional methods tend to leave the smaller soil particles on the surface, thus increasing the undesired caking action.

U.S. Pat. No. 2,503,993 to Blomgren discloses disk tiller blades having concavo-convex or "dished" contours facing in opposite directions on opposite halves of each of the blades. However, it is still clear that the soil is thrown at least partially in a lateral direction. The degree of "concaveness" in the Blomgren device is restricted by the physical limitation of shaping half of a disk to a dished shape. This design limits effectiveness in four ways. First, a significant amount of energy is required to move the soil laterally. Second, the Blomgren device tends to form furrows. Third, the soil tends to break down as a result of overworking, thereby leading to caking and puddling. Fourth, the degree of "concaveness" of the blade portions determines the width of the cut. Due to the physical limitations described above, the cut of these blades has a definite limit.

U.S. Pat. No. 2,029,872 to Johnson discloses a field tiller having irregularly shaped dished rotary blades. These blades make pits or holes in the ground at regular intervals to reduce wind or water erosion. Although the use of this field tiller will reduce the degree to which the soil is worked, the use of this device produces uneven results.

The following U.S. Patents disclose tiller blades with an irregular shape:
U.S. Pat. No. 2,164,214—Lindgren
U.S. Pat. No. 2,539,053—Blackledge
U.S. Pat. No. 420,403—Boyer
U.S. Pat. No. 1,058,140—Beene
U.S. Pat. No. 2,691,933—Emerson

SUMMARY OF THE INVENTION

The disk tiller blades of the present invention greatly reduce the energy needed to pull a gang of the blades through the soil, thus effecting great energy savings. Furthermore, the tiller blades of the present invention work the soil to the minimum extent necessary to achieve satisfactory planting.

In one embodiment of the invention, first and second semicircular concavo-convex members are joined so that the concave surfaces of these members face in opposite directions. An additional member interconnects each of the halves. In this embodiment, the blade is attached to a shaft at an angle of less than 90° so that the shaft lies in the plane of the additional member.

A second embodiment of this invention includes first, second, third and fourth concavo-convex quarter members wherein the convex surface of each member faces in a direction opposite to the convex surface of each of the adjacent members. Additional members interconnect the adjacent concavo-convex members. In this embodiment, the disk blade comprised of the quarter and interconnecting members is mounted so that the shaft is perpendicular thereto. However, each quarter member, rather than being at right angles with respect to the shaft, is turned with respect to the shaft, thus providing a slicing action of the soil as the disk rotates.

Instead of pushing the soil laterally with with respect to the direction of motion of the disk, the blades of the present invention merely cut through the soil so that the energy necessary to drive the tractor is greatly reduced, and the soil is worked to the minimum necessary to insure satisfactory planting. The slicing action of the blades leaves the soil particle size distribution fairly constant throughout the working depth.

The present invention is particularly suited for minimum tillage in planting corn, soybeans and the like in sod. Since only one axle of tiller blades of the present invention is required to provide all the seedbed preparation, it is quite practical to attach a seeding attachment such as a corn planter or drill, to prepare the seedbed in one operation.

BRIEF DESCRIPTION OF THE DRAWING

These and other objects and advantages of the invention will become more apparent and more readily appreciated from the following detailed description of the presently preferred exemplary embodiments of the invention taken in conjunction with the accompanying drawing, of which.

DETAILED DESCRIPTION OF THE PREFERRED EMBODIMENTS

Figure 1:
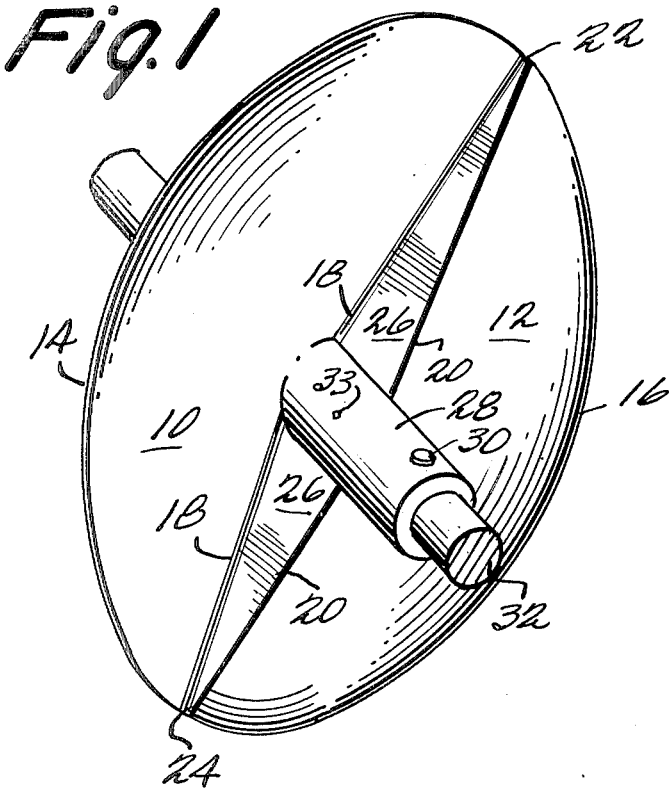
FIG. 1 is a perspective view of a first embodiment of the subject invention.

In the drawing, similar parts are identified by the same reference numeral.

Figure 2:
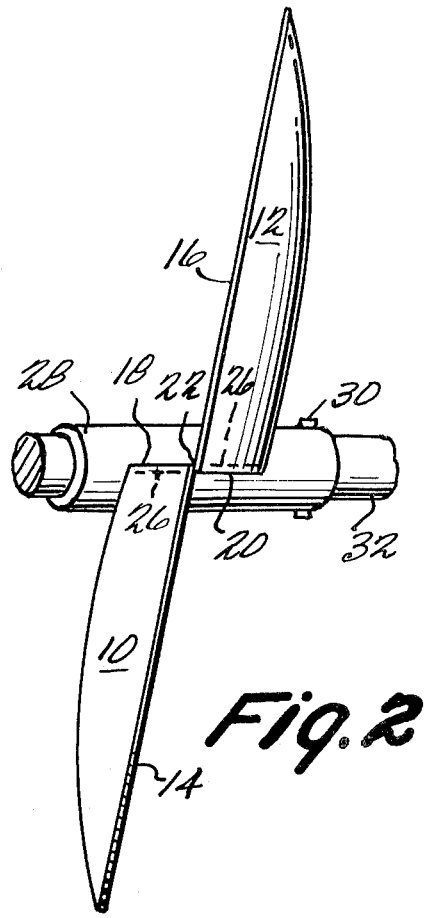
FIG. 2 is a side view of a first embodiment with the blade portion in elevation, the shaft forming an angle with respect to the plane of the paper.
Figure 3:
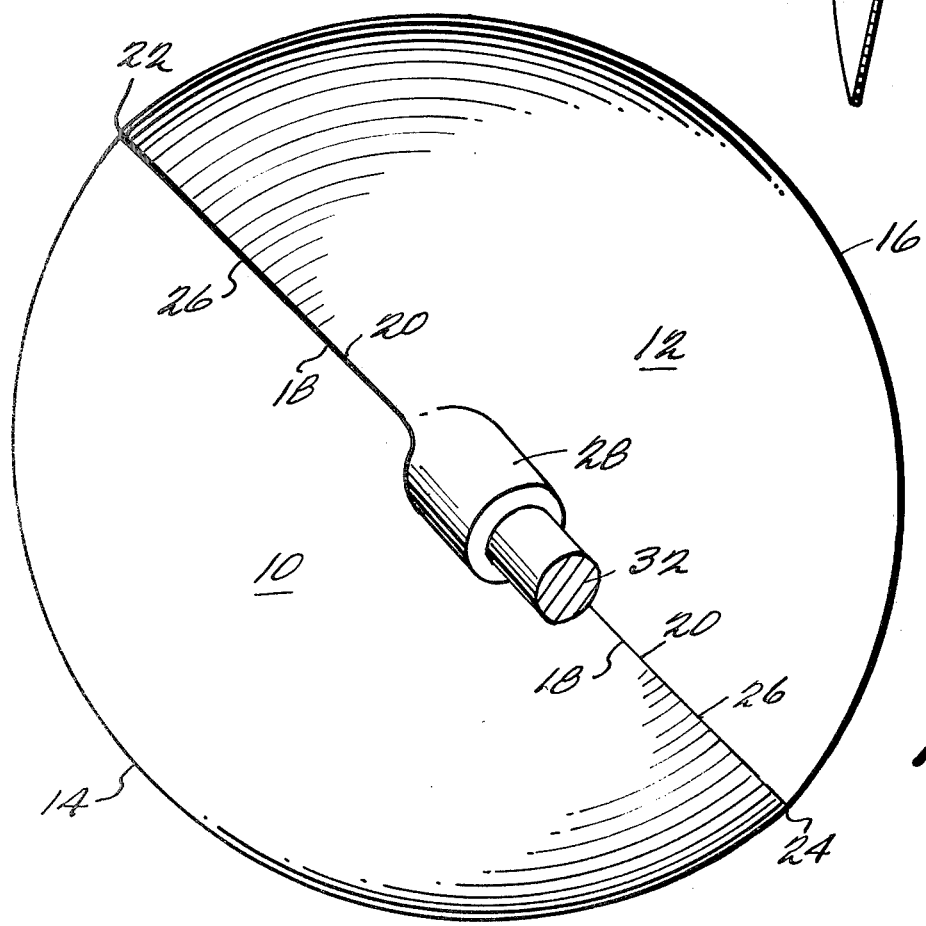
FIG. 3 is an end view of the first embodiment with the blade in elevation.

Referring now to FIGS. 1-3, the tiller blade of a first embodiment of the present invention includes concavo-convex members 10 and 12. Members 10 and 12 have curved edges 14 and 16, respectively, and straight edges 18 and 20, respectively. Member 10 is directly connected to member 12 at only points 22 and 24 where straight edges 18 and 20 intersect curved portions 14 and 16, respectively. The concave surface of member 10 faces in a direction opposite the concave face of member 12.

Interconnecting member 26 connects straight edge 18 of member 10 to straight edge 20 of member 12. Mounting means such as pipe 28 is attached to members 10 and 12 and interconnecting member 26. A hole in pipe 28 enables pin 30 to extend therethrough locking the blade to shaft 32 upon which a plurality of blades may be mounted. Those skilled in the art will readily appreciate that any one of many other suitable mounting means may be employed.

So that each member 10 and 12 is properly oriented with respect to the soil at all times during the rotation of the blade, the angular orientation of members 10 and 12 with respect to pipe 28 is important. In the preferred embodiment, pipe 28 lies in the plane of interconnecting member 26 and the longitudinal axis of pipe 28 forms an angle of less than 90° with respect to an imaginary line connecting points 22 and 24. The actual angle formed with respect to the imaginary line may be varied to alter the width of the tillage desired per each blade. However, it is preferable that the angle is between 45° and 89°. In the preferred embodiment, an angle of between 70° and 85° is employed.

Since pipe 28 lies in the plane of interconnecting member 26 and forms an angle of less than 90° with respect to an imaginary line between points 22 and 24, the angle between shaft 32 and the line connecting the portion of either edge 14 or 16 directly below shaft 32 and point 33 midway between the intersection of edges 18 and 20 on shaft 32 varies as the shaft and blade rotate. When the imaginary line connecting points 22 and 24 is positioned horizontally, the line connecting point 33 and the point on edge 14 or 16 directly below shaft 32 is perpendicular to the longitudinal axis of shaft 32. When either point 22 or 24 is directly below shaft 32, the angle between shaft 32 and the line connecting either point 22 or 24 and point 33 is a minimum. Therefore, to insure that the depth of cut is constant as the blade rotates, the distance between point 33 and points 22 and 24 must be made greater than the distance between point 33 and the points along edges 14 and 16 equidistance from points 22 and 24. Thus, edges 14 and 16 are not perfectly round. To maintain the cutting depth constant, independent of the rotational position of the blade, the perpendicular distance from edges 14 and 16 to shaft 32 must be constant along these edges.

When a plurality of disks of this embodiment are mounted on a shaft in the same alignment, there is a slight tendency during operation for the shaft to pull to one side. It has been found advantageous to pair the disks on the shaft in such a manner that each offsets the tendency of the other to pull. The pairing of disks thus eliminates this side-pulling tendency.

In practice, there still is a rather slight, and perhaps insignificant, tendency to move the soil in a lateral direction. The disks should preferably be mounted on shaft 32 so that as the disk rotates, there is a tendency to move the dirt inward rather than outward. If the disks of this embodiment are so mounted, even small furrows are avoided.

Figure 4:
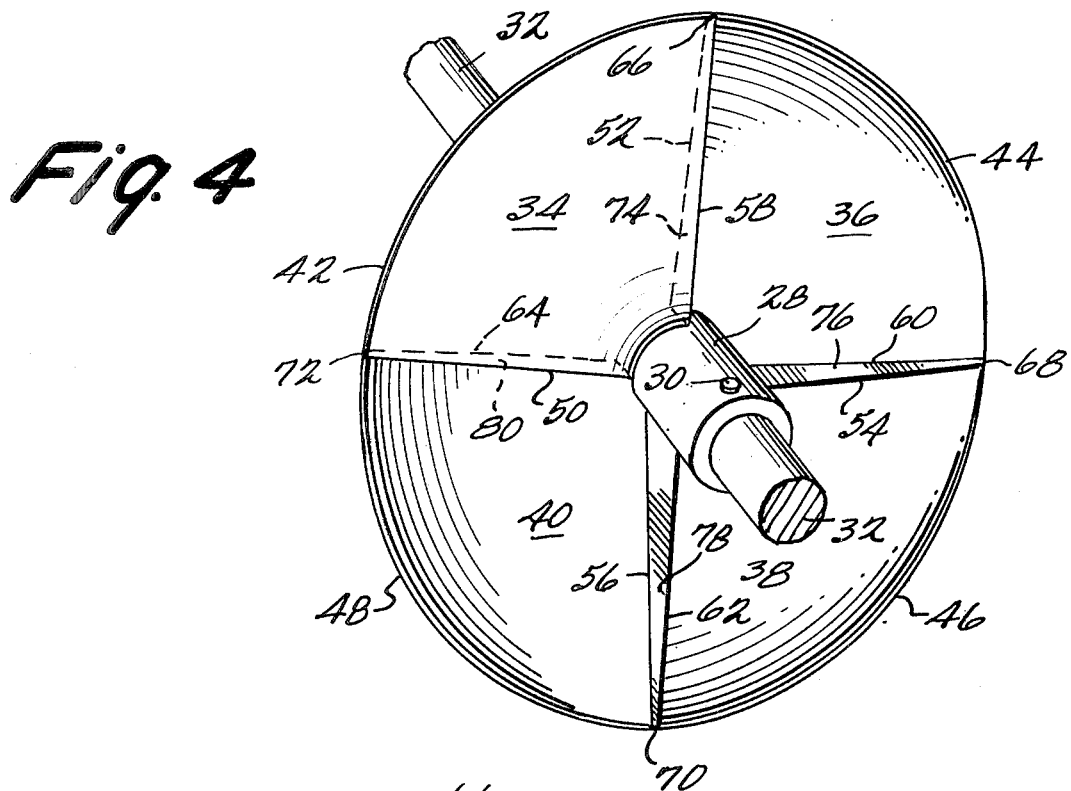
FIG. 4 is a perspective view of a second embodiment of the subject invention.
Figure 5:
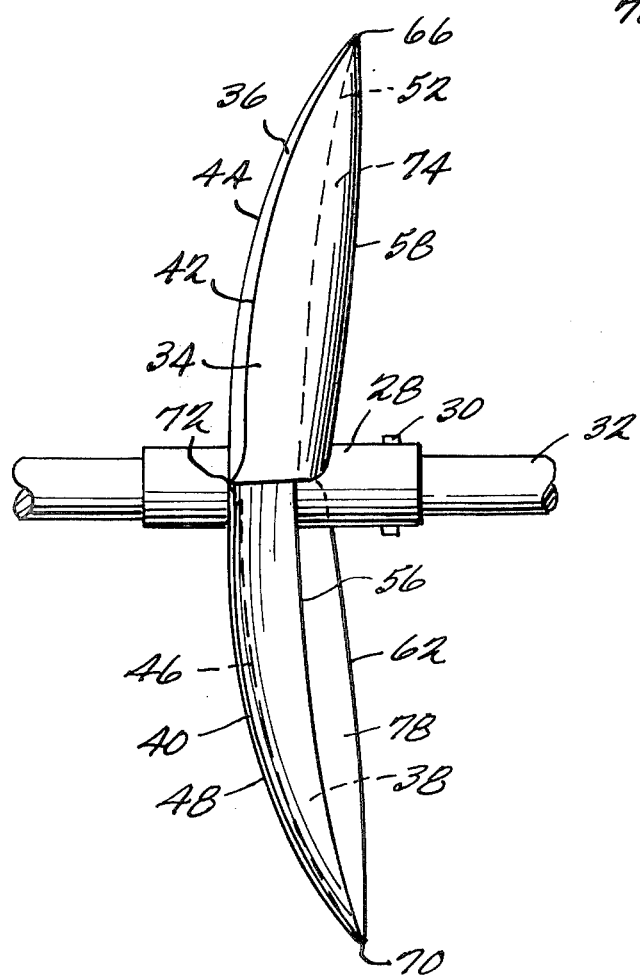
FIG. 5 is a side elevational view of the second embodiment.

A second embodiment of the present invention is illustrated in FIGS. 4 and 5. Concavo-convex members 34, 36, 38 and 40 have curved portions 42, 44, 46 and 48, respectively, first straight edges 50, 52, 54 and 56, respectively, and second straight edges 58, 60, 62 and 64, respectively. The first and second straight edges of each of members 34, 36, 38 and 40 are perpendicularly oriented so that portions 34, 36, 38 and 40 are each quarter sections of the blade. Each member 34, 36, 38 and 40 is directly connected to the adjacent members only at points 66, 68, 70 and 72. Also, the concave surface of each member 34, 36, 38 and 40 faces in a direction opposite the concave surface of each of the adjacent members. For example, in FIG. 4, the concave surfaces of members 36 and 40 face the observer, while the concave surfaces of members 34 and 38 face away from the observer.

Interconnecting the second straight edge of each quarter section with a first straight edge of the adjacent quarter section are interconnecting members 74, 76, 78 and 80. For example, interconnecting member 74 connects second straight edge 58 with first straight edge 52. Mounting means such as pipe 28 is connected to members 34, 36, 38 and 40 and interconnecting members 74, 76, 78 and 80. Pipe 28 is oriented so that its longitudinal axis lies in both the plane defined by interconnecting members 74 and 78, and the plane defined by interconnecting members 76 and 80.

The longitudinal axis of pipe 28 is not perpendicular to the planes defined by each of edges 42, 44, 46 and 48. Instead, the axis of pipe 28 forms angles with respect to the planes defined by each of edges 42, 44, 46 and 48. So that members 34, 36, 38 and 40 may be interconnected as illustrated, a line perpendicular to each plane defined by edges 42, 44, 46 and 48 forms an angle with the longitudinal axis of pipe 28 in a first direction from the axis. The perpendiculars to the planes defined by adjacent edges form the same angle with the longitudinal axis of pipe 28, but in the opposite direction from the axis.

Thus, the perpendicular from the plane defined by edge 42 forms an angle with the axis of pipe 28 in a certain direction from the axis. The perpendiculars from the planes defined by edges 44 and 48 form an equal angle with the axis of pipe 28, but in the opposite direction from the axis. This angulation of the blades provides the slicing action of the soil as the disk rotates. The actual angle of the axis of pipe 28 with the perpendicular from each of the imaginary planes will determine the width that each blade will till. As the angle decreases, the width increases. This angle between the perpendicular from each of the imaginary planes and pipe 28 may vary from 1° to 45°, but in the preferred embodiment is between 5° and 25°.

In either embodiment, the blade is comprised of heat-treated steel. The diameter of the blade may vary depending on depth and width of cut desired, but is typically between 16 and 38 inches.

Any of a number of methods of manufacturing the disk, well-known in the art, may be employed. For example, an oblong piece of metal of the desired thickness and diameter may be heated, and stamped in the appropriate pattern. A hole for pipe 28 may then be cut, after which the blade may be heat-treated. Pipe 28 may then be attached to the blade by welding techniques or the like. Alternatively, the blade may be formed by cutting a conventional rotary disk tiller blade into either two or four pieces. The blade pieces together with appropriate interconnecting members may then be welded together to form a tiller blade of the configuration described above.

In the preferred embodiment, it is anticipated that the shaft to which the blades are mounted will be driven at a speed of between 150 and 250 revolutions per minute. The direction of rotation should be the same direction as the rotation of the tires of the tractor pulling the shaft. Since the shaft rotates in a forward direction, a corn planter or drill, or the like, may be pulled by utilizing the energy generated by the forward thrust of the disk without requiring any extra fuel. Also, the forward rotation of the blades greatly aids in crossing wet spots in the field. By employing the tiller blades as described above, it appears that fuel savings on the order of 50 to 75 percent will be realized over conventional disk tilling methods.

Although only two exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A blade for a rotary disk tiller having a shaft, said blade comprising:
   first and second concavo-convex members each having a curved edge and a second edge, said second edge intersecting said curved edge at two points;
   said first and second members being directly joined only by the connection of each of said first member two points to one of said second member two points, respectively, said first member concave surface facing in an opposite direction from said second member concave surface;
   a member interconnecting said first member second edge and said second member second edge; and
   means for mounting said members to said shaft.

2. Apparatus as in claim 1 wherein said mounting means is connected to said members equidistant between said two points, said first and second member second edges defining an imaginary plane, the longitudinal axis of said mounting means lying in said plane and forming an angle of less than 90° with a line interconnecting said first and second points.

3. Apparatus as in claim 2 wherein said angle is between 45° and 89°.

4. Apparatus as in claim 2 wherein said angle is between 70° and 85°.

5. A blade for a rotary disk tiller having a shaft, said blade comprising:
   first and second concavo-convex members each having a curved edge and a straight edge, said straight edge intersecting said curved edge at two points;
   said first and second members being directly joined only by the connection of each of said first member two points to one of said second member two points, respectively, said first member concave surface facing in an opposite direction from said second member concave surface;
   a member interconnecting said first member straight edge and said second member straight edge, said interconnecting member lying in a plane; and
   means for mounting said members to said shaft, said mounting means connected to said members equidistant between said two points, the longitudinal axis of said mounting means lying in said plane and forming an angle of less than 90° with a line interconnecting said two points.

6. A blade for a rotary disk tiller having a shaft, said blade comprising:
   first, second, third and fourth concavo-convex members each having a curved edge and first and second edges, said first and second edges intersecting said curved edge at first and second points, respectively;
   said first and second members having concave surfaces facing in opposite directions, said first member second point connected to said second member first point;
   said second and third members having concave surfaces facing in opposite directions, said second member second point connected to said third member first point;
   said third and fourth members having concave surfaces facing in opposite directions, said third member second point connected to said fourth member first point;
   said fourth member second point connected to said first member first point;
   a first interconnecting member interconnecting said first member second edge and said second member first edge;
   a second interconnecting member interconnecting said second member second edge and said third member first edge;
   a third interconnecting member interconnecting said third member second edge and said fourth member, first edge;
   a fourth interconnecting member interconnecting said fourth member second edge and said first member first edge; and
   means for mounting said members to said shaft.

7. Apparatus as in claim 6 wherein said mounting means is connected to said members equidistant from all of said points, said first and second edges defining two planes, the longitudinal axis of said mounting means lying in both of said planes.

8. Apparatus as in either claim 1 or claim 6 wherein said concavo-convex members and said interconnecting members are formed from a single, stamped sheet of metal.

9. Apparatus as in either claim 1 or claim 6 wherein each of said members is a separate piece of metal interconnected by welding.

10. Apparatus as in either claim 1 or claim 6 wherein the perpendicular distance between any point on any of said curved edges and the longitudinal axis of said mounting means is substantially constant.

11. A blade for a rotary disk tiller having a shaft, said blade comprising:

first, second, third and fourth concavo-convex members each having a curved edge and first and second straight edges, said first and second straight edges intersecting said curved edge at first and second points, respectively;

said first and second members having concave surfaces facing in opposite directions, said first member second point connected to said second member first point;

said second and third members having concave surfaces facing in opposite directions, said second member second point connected to said third member first point;

said third and fourth members having concave surfaces facing in opposite directions, said third member second point connected to said fourth member first point;

said third member second point connected to said first member first point;

a first interconnecting member interconnecting said first member second straight edge and said second member first straight edge;

a second interconnecting member interconnecting said second member second straight edge and said third member first straight edge;

a third interconnecting member interconnecting said third member second straight edge and said fourth member first straight edge;

a fourth interconnecting member interconnecting said fourth member second straight edge and said first member first straight edge;

said first, second third and fourth interconnecting members defining two planes; and means for mounting said members to said shaft, said mounting means connected to said members equidistant between all of said points, the longitudinal axis of said mounting means lying in both of said planes.

12. Apparatus as in claim 6 or 4 wherein:

each of said curved edges defines a plane;

the planes defined by said first and third members curved edges having perpendiculars forming an angle with the longitudinal axis of said mounting means in a first direction from said axis; and the planes defined by said second and fourth members curved edges having perpendiculars forming said angle with the longitudinal axis of said mounting means in a second direction from said axis, opposite said first direction.

* * * * *